(12) United States Patent
Steele

(10) Patent No.: US 8,298,109 B2
(45) Date of Patent: Oct. 30, 2012

(54) TRANSMISSION LUBRICATION ASSEMBLY

(75) Inventor: James Kevin Steele, Pontotoc, MS (US)

(73) Assignee: Competition Cams, Inc., Memphis, TN (US)

( * ) Notice: Subject to any disclaimer, the term of this patent is extended or adjusted under 35 U.S.C. 154(b) by 278 days.

(21) Appl. No.: 12/715,472

(22) Filed: Mar. 2, 2010

(65) Prior Publication Data

US 2011/0218071 A1 Sep. 8, 2011

(51) Int. Cl.
*F16H 23/00* (2006.01)

(52) U.S. Cl. ..... 475/160; 184/6.17; 184/6.18; 184/6.12; 475/159

(58) Field of Classification Search ................. 475/159, 475/160; 184/6.12, 6.17, 6.18; 74/467
See application file for complete search history.

(56) References Cited

U.S. PATENT DOCUMENTS

| 4,095,487 | A * | 6/1978 | Cartwright et al. ............. 475/71 |
| 7,850,566 | B2 * | 12/2010 | Kim ............................... 475/159 |
| 2001/0011616 | A1 * | 8/2001 | Kageyama et al. .......... 184/6.12 |
| 2006/0191746 | A1 * | 8/2006 | Diosi et al. ................... 184/6.18 |

* cited by examiner

*Primary Examiner* — David D Le
*Assistant Examiner* — Lillian Nguyen
(74) *Attorney, Agent, or Firm* — Arent Fox LLP

(57) ABSTRACT

A transmission lubrication assembly includes a stator tube having a fluid passage and a sleeve bore, and a stator tube sleeve having a lubrication path provided along an external peripheral service thereof. In another aspect, the transmission lubrication assembly may include a solid input shaft rotatably received within the stator tube, a valve body, and a lubrication tube that provides fluid communication between the fluid passage and the valve body. In yet another aspect, a method of lubricating a transmission assembly includes providing a pressurized source of lubricating fluid, providing a stator tube comprising a fluid passage, and directing a portion of the lubricating fluid to a section of the transmission assembly by way of a stator tube sleeve, wherein the stator tube sleeve has an axial channel through which the lubricating fluid flows.

17 Claims, 7 Drawing Sheets

TRANSMISSION LUBRICATION ASSEMBLY

BACKGROUND OF THE INVENTION

1. Field of the Invention

Aspects of the present invention relate to transmission lubrication and, in particular, to an assembly, and related systems and methods for externally providing lubrication to various internal components of a transmission.

2. Background of the Technology

A transmission is a device for transmitting the power generated by an engine, typically via a drive shaft connected to drive wheels on a vehicle. A conventional transmission provides for a variety of forward gears, as well as a neutral and a reverse gear. The typical components of an automatic transmission include a torque converter to allow a vehicle to stop while still in gear and with the engine running, a hydraulic system that pumps pressurized fluid through a valve body for controlling the planetary gear set through a series of clutches and bands, one or more planetary gear sets for providing the various gears, a governor to monitor speed and control shifting, and an oiling system for lubricating the many moving parts of the transmission assembly. A transmission housing or transmission case is also provided to protect and properly seal the various components internal thereto.

FIGS. 1-3 illustrate various aspects of a transmission assembly of the related art. For example, FIG. 1 illustrates an end view of an input shaft section 10 of a conventional transmission assembly, wherein an input shaft 20 is rotatably fitted with planetary gears 30 and a stator tube 40.

FIG. 2 is a partial sectional view of the input shaft section 10 taken along line C-C of FIG. 1, and generally depicts additional aspects of a related art transmission, including a high gear clutch and drum assembly 50, planetary section 60, a planetary output shaft 70, which may be integrally connected to the planetary section 60, a governor support 80, and a transmission case 90. As shown in FIG. 2, the stator tube 40 may comprise an elongated cylindrical tube portion 42 concentrically arranged around a forward portion of the input shaft 20, a flanged section 44, and a cylindrical hub section 46. The cylindrical hub section 46 may be formed with a sleeve bore 45 axially extending into the hub section 46 from a distal end 47 of the stator tube 40, the sleeve bore 45 having a larger inner diameter than an inner diameter of the tube portion 42. A stator tube sleeve 48 may be concentrically positioned around an outer surface of the input shaft 20 inside the sleeve bore 45. The stator tube sleeve 48 is configured with an inner diameter to minimize clearance between the stator tube sleeve 48 and the input shaft 20 while permitting free rotation of the input shaft 20 during operation of the transmission. The cylindrical hub section 46 may be formed with hub annulets 49 on an outer peripheral surface to provide seats for sealing rings, for example. The planetary gears 30 and the planetary section 60 may be coupled to an end portion of the input shaft 20, for example.

In the transmission of the related art shown in FIGS. 1-3, the interior components of the transmission receive a lubricating fluid, such as transmission oil, through a fluid passage 100. The fluid passage 100 may be cross-drilled, for example, into the flanged section 44 of the stator tube 40. The fluid passage 100 allows the pressurized lubrication fluid to flow radially inward toward the stator tube sleeve 48. As shown in FIG. 3, which is an enlarged view of the detail Section D, shown in dashed circle in FIG. 2, the stator tube sleeve 48 may comprise features, such as channels, grooves, protrusions, and/or through-holes, to direct and control the communication of lubricating fluid to particular areas or components of the transmission.

For example, as shown in FIGS. 2 and 3, the lubricating fluid communicates with the stator tube sleeve 48 by way of the fluid passage 100. As shown in FIG. 3, the stator tube sleeve 48 is formed and/or arranged so as to provide a gap 110 between the inner peripheral surface of the stator tube 40 and an outer peripheral surface of the stator tube sleeve 48. As the lubricating fluid travels through the gap 110, a channel 115 draws off some of the pressurized fluid to lubricate the components of the high gear clutch and drum assembly 50, for example, while the remaining fluid is forced through an opening 120 in the stator tube sleeve 48 and into an annular chamber 125.

As shown in FIG. 2, a transverse fluid passage 130 is provided that extends radially inward from the outer surface of the input shaft 20 and provides fluid communication between the annular chamber 125 and a central fluid passage 135. The central fluid passage 135 extends through the center of the input shaft 20 from a point at or near the transverse fluid passage 130 to an outlet 140 (see also FIG. 1) at one end of the input shaft 20. Lubrication openings 145 are provided at predetermined locations along the length of the input shaft 20 and extend radially from the central fluid passage 135 to the outer surface of the input shaft 20 to provide fluid communication between the central fluid passage 135 and the areas of the transmission containing the planetary gears 30, for example, and various other internal components, such as reverse clutches, washers, and rear case bushings and/or bearings. Thus, the pressurized fluid in the annular chamber 125 is forced through the transverse fluid passage 130 and into the central fluid passage 135, from which the pressurized fluid exits through the lubrication holes 145 and the outlet 140, to provide lubrication to the internal components of the transmission.

A shortcoming, among others, of the conventional transmission assembly of the related art described above is that the transmission lubrication system relies on internally feeding the lubricant (e.g., transmission fluid) to the various components through openings or passages in the shafts or components of the transmission. In particular, the many openings or passages in the input shaft 20 may significantly weaken the torque-bearing capability of the component and significantly introduce areas of substantial stress concentration, which may lead in turn to the eventual damage or failure of the input shaft 20.

There is an unmet need in the art for a transmission lubrication system that effectively lubricates the internal components of a transmission assembly without the need to provide openings, passages, or other weakening features, in the input shaft of the transmission assembly.

SUMMARY OF THE INVENTION

Aspects of the present invention include features for lubricating a transmission assembly without having to provide openings or passages in the input shaft.

Among other things, aspects of the present invention enhance the performance of a transmission assembly by allowing for a solid input shaft capable of sustaining higher torque without failure, by, for example, eliminating weaknesses in the integrity of conventional transmissions produced by use of openings or passages in the input shaft for internally lubricating the components of the transmission assembly.

Exemplary features usable in accordance with aspects of the present invention include a transmission lubrication assembly that has a stator tube with a fluid passage, an input shaft rotatably received within the stator tube, a transmission case that has one or more lubrication conduits, and one or more lubrication tubes that provide fluid communication between the fluid passage(s) and the lubrication conduit(s).

In accordance with other aspects of the present invention, the transmission lubrication assembly may include a stator tube sleeve provided between the input shaft and the stator tube, wherein the stator tube sleeve forms a lubrication path that extends from the fluid passage to at least one end of the stator tube.

In accordance with aspects of the present invention, a method of lubricating a transmission assembly may include providing a pressurized source of lubricating fluid, providing a stator tube comprising a fluid passage, and directing a portion of the lubricating fluid to a section of the transmission assembly by way of a stator tube sleeve, wherein the stator tube sleeve has an axial channel through which the lubricating fluid flows.

Additional advantages and novel features of aspects of the invention will be set forth in part in the description that follows, and in part will become more apparent to those skilled in the art upon examination of the following or upon learning by practice thereof.

DETAILED DESCRIPTION

Figure 1:
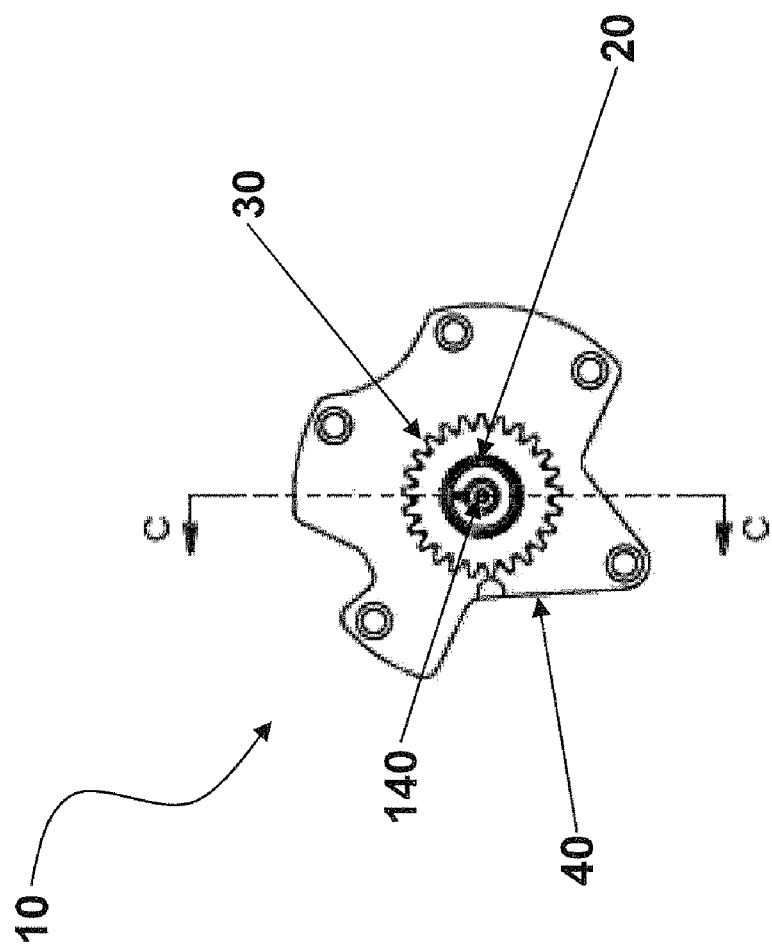
FIG. 1 is an end view of an input shaft section of a transmission assembly of the related art.

The detailed description may include specific details for illustrating various aspects of a transmission lubrication assembly and related systems and methods. However, it will be apparent to those skilled in the art that aspects of the invention may be practiced without these specific details. In some instances, previously described or well known related elements may be shown in block diagram form, generally depicted, or omitted, to avoid obscuring aspects of the inventive concepts presented throughout this disclosure.

Various aspects of a transmission lubrication assembly, for example, may be illustrated by describing components that are coupled together. As used herein, the term "coupled" is used to indicate either a direct connection between two components or, where appropriate, an indirect connection of two components through intervening or intermediate components. In contrast, when a component is referred to as being "directly coupled" to another component, there are no intervening elements present.

Relative terms such as "lower" or "bottom" and "upper" or "top" may be used herein to describe one element's relationship to another element, from the perspective illustrated in the drawings. It will be understood that relative terms are intended to encompass different orientations of an apparatus in addition to the orientation depicted in the drawings. By way of example, if an apparatus in the drawings is turned over, elements described as being on the "bottom" side of the other elements would then be oriented on the "top" side of those other elements. The term "bottom" can therefore encompass both an orientation of "bottom" and "top" depending on the particular orientation of the apparatus.

Figure 4:
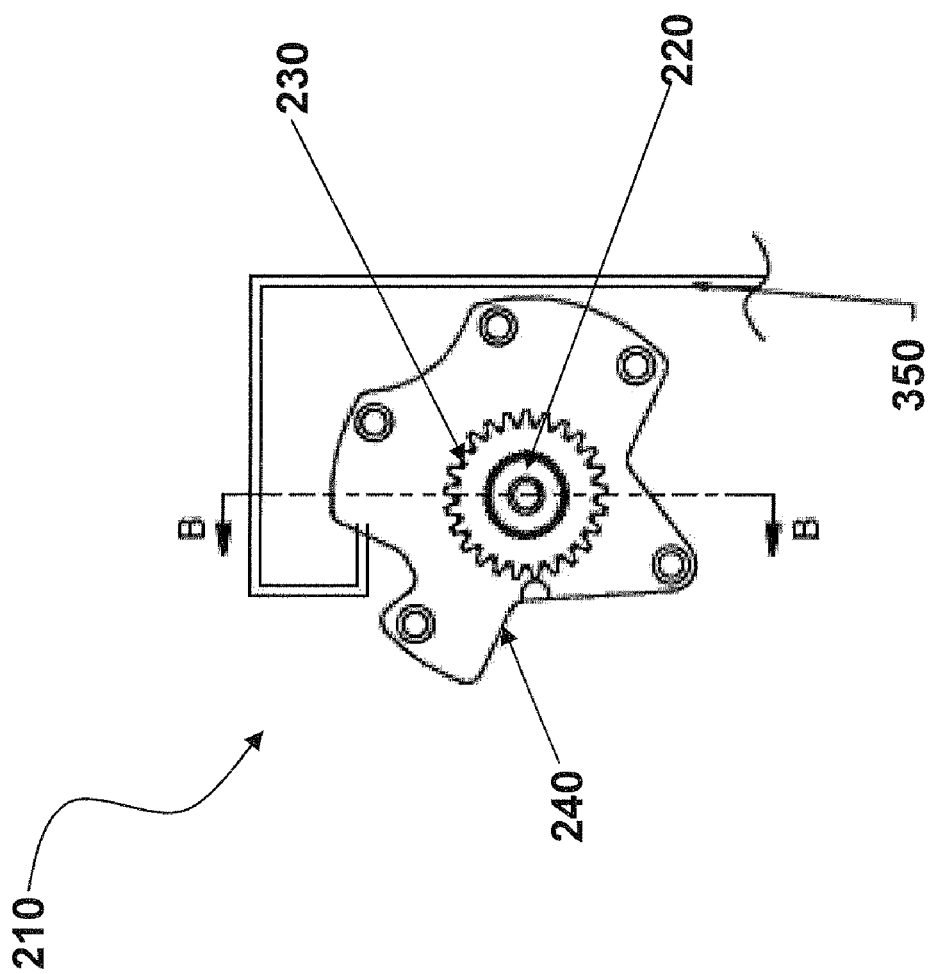
FIG. 4 is an end view of an input shaft section of a transmission assembly, in accordance with aspects of the present invention.

FIG. 4 illustrates an end view of an input shaft section 210 for a transmission assembly, in accordance with aspects of the present invention. The input shaft section 210 includes an input shaft 220 that is fitted with a sun gear 230 and a flange gear 232 (see FIG. 5), and a stator tube 240. By comparison to the input shaft section 10 of the related art transmission assembly depicted in FIG. 1, FIG. 4 illustrates the lack of an outlet in the end of the input shaft 220. Furthermore, in accordance with aspects of the present invention, a lubrication tube 350 may connect a lubrication passage 300 (see FIGS. 5 and 6) provided in the stator tube 240 to a valve body 292 provided toward a rear portion of a transmission case 290.

Figure 5:
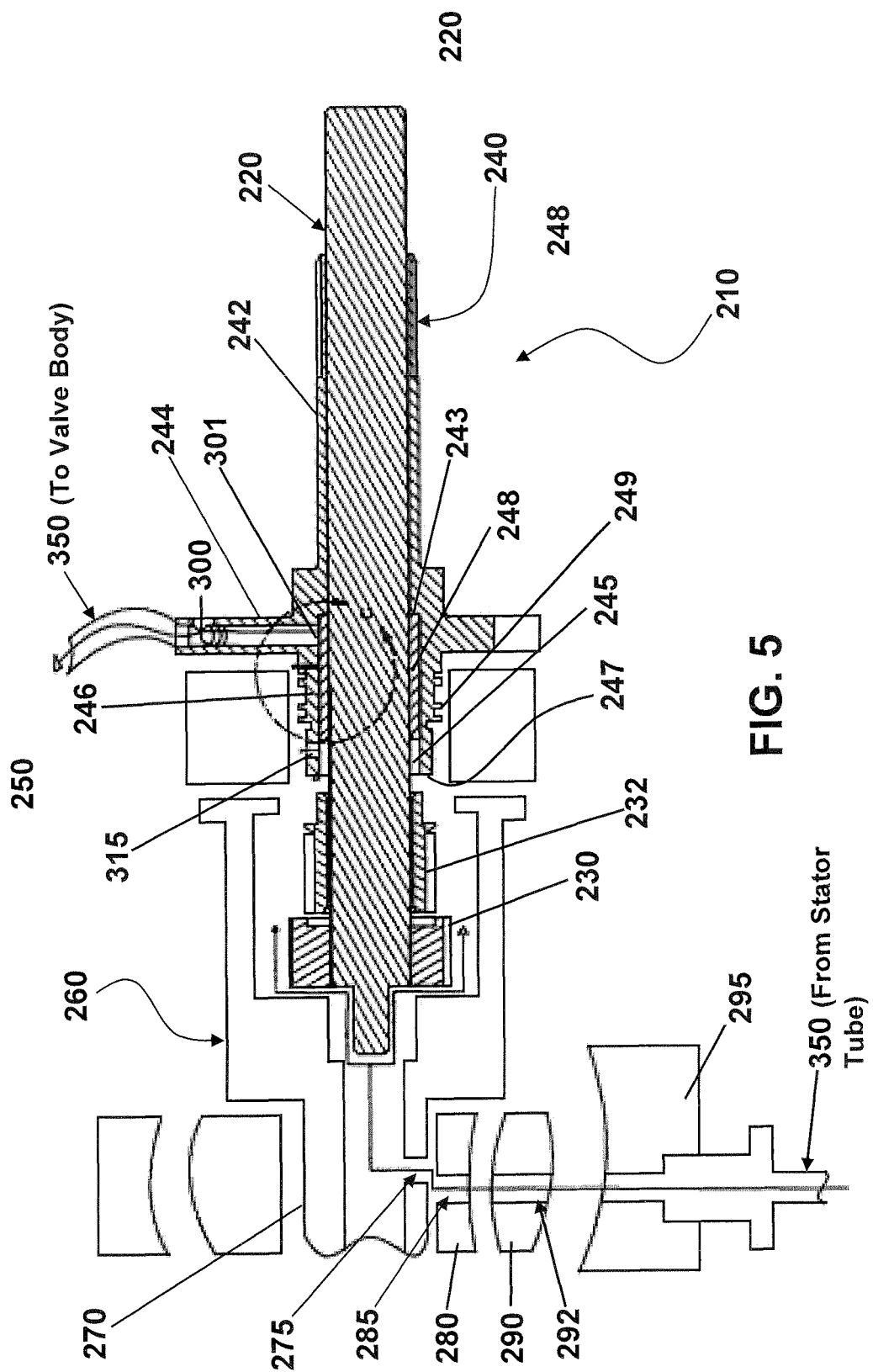
FIG. 5 is a partial sectional view of the input shaft section of a transmission assembly taken along line B-B of FIG. 4, in accordance with aspects of the present invention.

To further illustrate features in accordance with aspects of the present invention, FIG. 5 provides a partial sectional view of the input shaft section 210 taken along line B-B of FIG. 4. Additional components of a transmission assembly are generally depicted, including a high gear clutch and drum assembly 250, a planetary section 260, which may include a ring gear, a planet carrier and planet gears for engaging the sun gear 230 and/or the flange gear 232 in a compound planetary gearset configuration, for example, a planetary output shaft 270, which may be integrally connected to the planetary section 260, a governor support 280, a transmission case 290, and a valve body 295. As shown in FIG. 5, the stator tube 240 may comprise a conduit 242, such as an elongated cylindrical tube portion, arranged around a forward portion of the input shaft 220, a flanged section 244, and a cylindrical hub section 246. The cylindrical hub section 246 may be formed with a sleeve bore 245 axially extending into the hub section 246 from a distal end 247 of the stator tube 240, the sleeve bore 245 having a larger inner diameter than an inner diameter of the conduit 242. A stator tube sleeve 248 may be interference fit with the stator tube 240 to be concentrically positioned around an outer surface of the input shaft 220 inside the sleeve bore 245. The stator tube sleeve 248 is positioned axially inside the sleeve bore 245 to abut a step 243 at the forward end of the sleeve bore 245. The stator tube sleeve 248 may thus traverse an opening 301 of the lubrication passage 300 where the lubrication passage 300 opens into the sleeve bore 245.

The cylindrical hub section 246 may be formed with hub annulets 249 on an outer peripheral surface to provide seats for sealing rings, for example. The sun gear 230, flange gear 232, and the planetary section 260 may be rotatably coupled to an end portion of the input shaft 220, for example.

Figure 2:
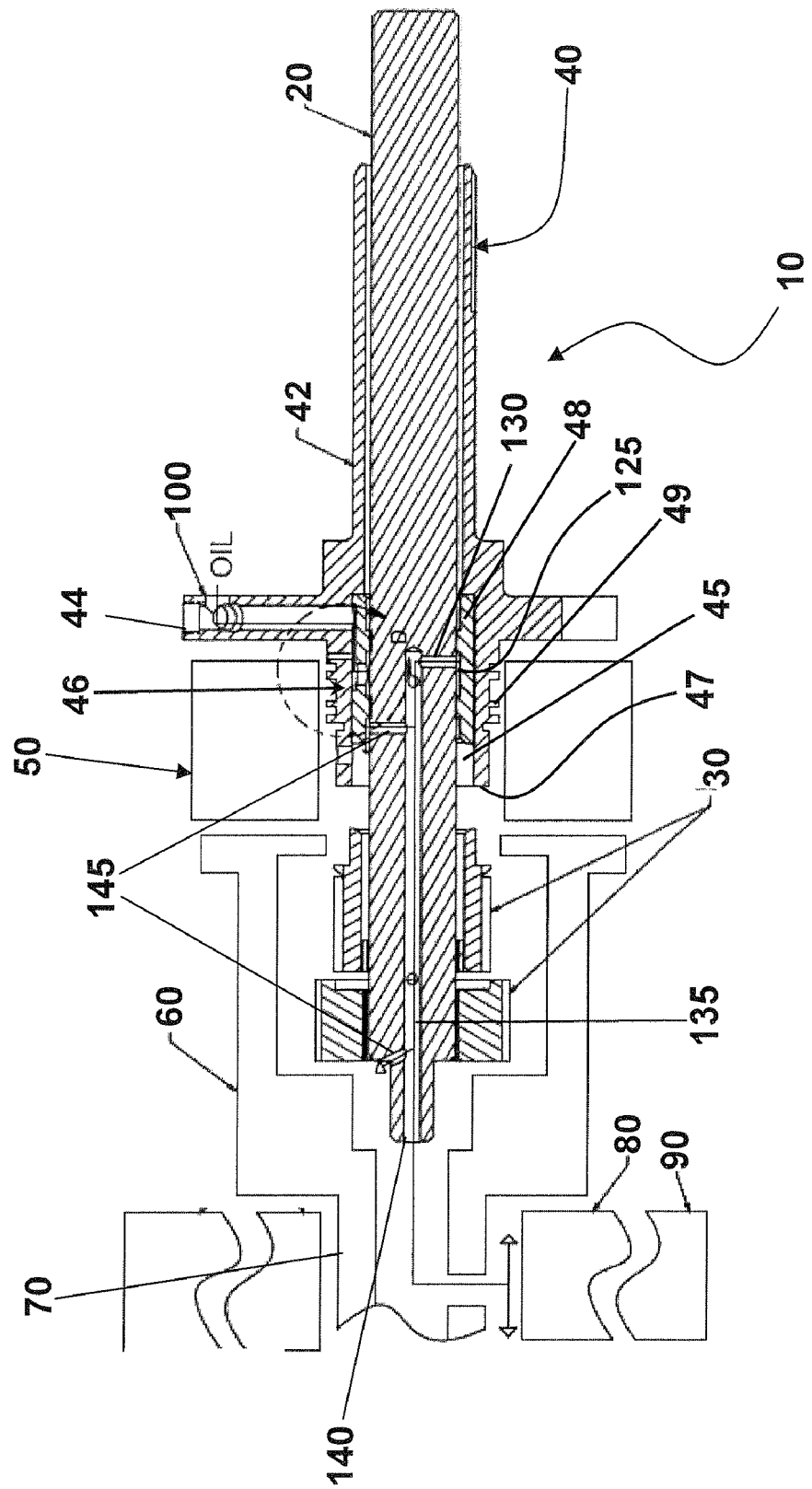
FIG. 2 is a partial sectional view of the input shaft section of a transmission assembly of the related art taken along line C-C of FIG. 1.
Figure 3:
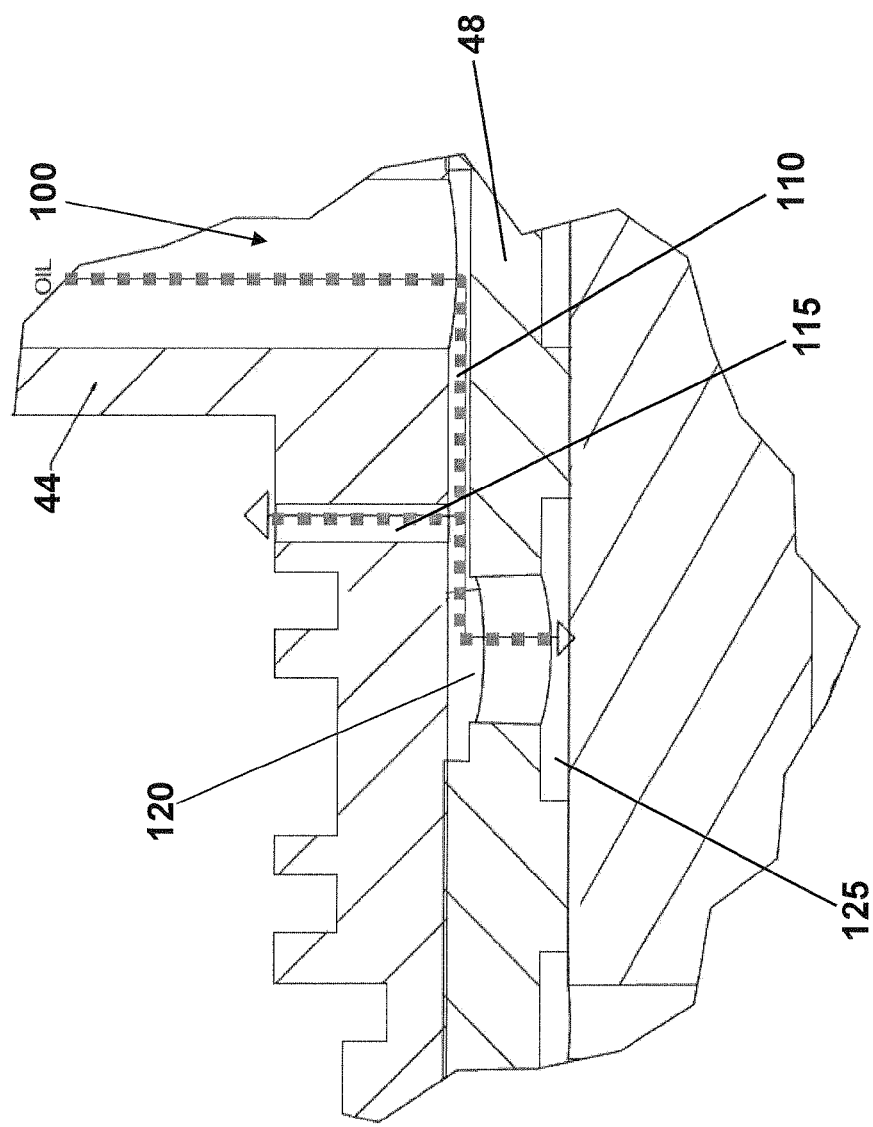
FIG. 3 is an enlarged view of the detail Section D, shown in dashed circle in FIG. 2.
Figure 6:
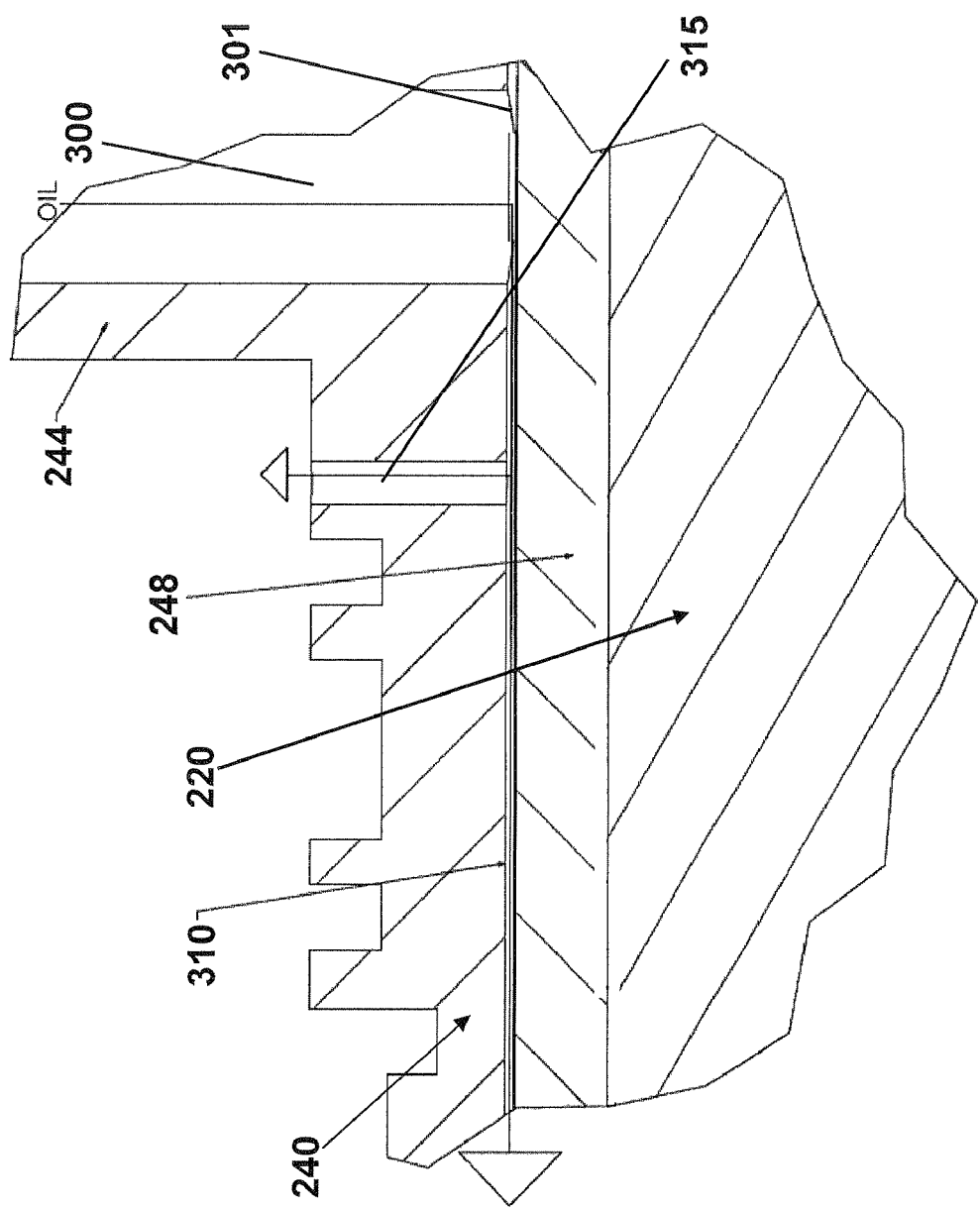
FIG. 6 is an enlarged view of the detail Section C, shown in dashed circle in FIG. 5.

In the related art transmission shown in FIGS. 1-3, a lubricating fluid is forced through passages and holes in the input shaft 20 to lubricate the internal components of the transmission. As shown in FIGS. 4-6, the input shaft 220, in accordance with aspects of the present invention, may be formed to be a completely solid shaft, for example, with no through-holes or internal passages, allowing for a significantly stronger shaft that can sustain greater torque without breaking, for example. The transmission lubrication assembly, in accordance with aspects of the present invention, maintains the necessary lubrication to the proper locations of the transmission through a stator tube sleeve 248 (in contrast to the sleeve 48 of the related art transmission assembly of FIG. 3), and by redirecting a portion of the lubrication fluid from the lubrication passage 300, through the lubrication tube 350, and to the valve body 295.

As shown in FIG. 5, automatic transmission fluid, for example, may be provided from a transmission cooler to a fluid passage 300. The fluid passage 300 may be cross-drilled into the flanged section 244 of the stator tube 240. The fluid passage 300 allows the fluid to flow (e.g., under pressure) radially inward toward the stator tube sleeve 248. As the pressurized fluid enters the fluid passage 300, for example, a portion of the lubrication fluid may be forced into the lubrication tube 350.

Figure 7:
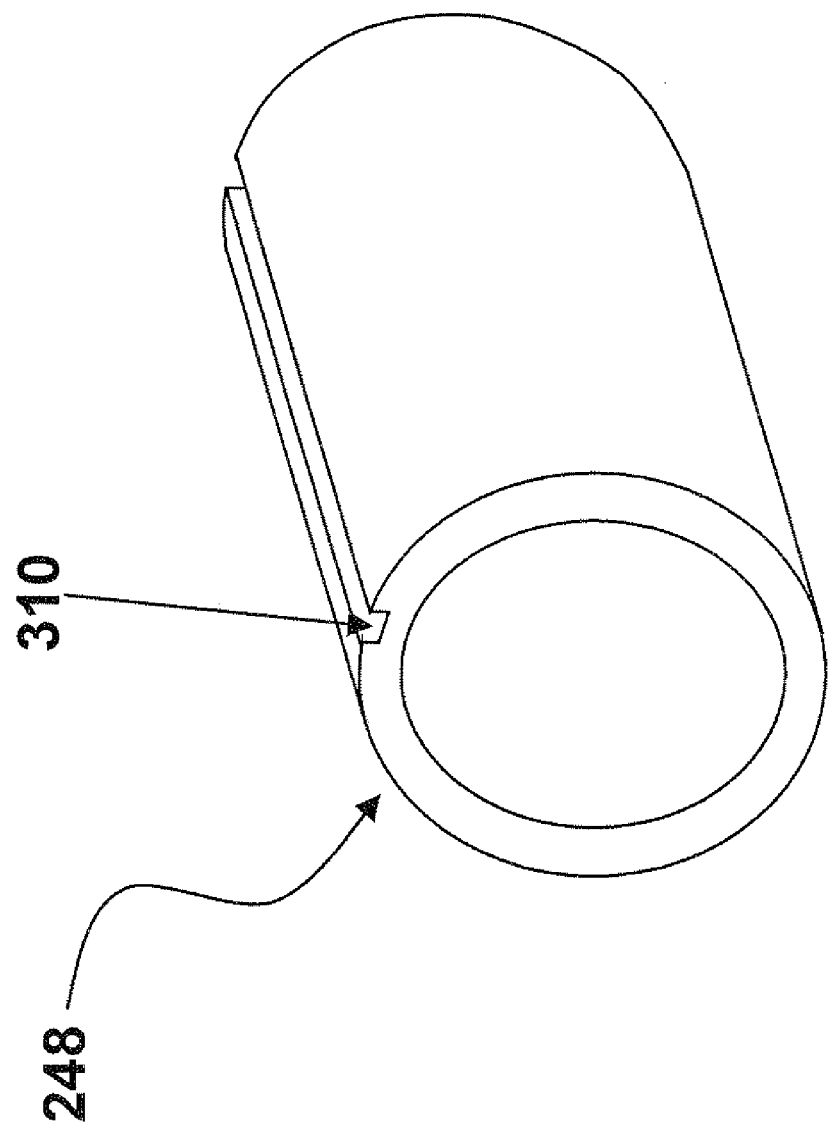
FIG. 7 is a perspective view of an exemplary stator tube sleeve, in accordance with aspects of the present invention.

As shown in FIG. 6, which is an enlarged view of the detail Section C, shown in dashed circle in FIG. 5, because the lubrication fluid is not fed through the interior of the input shaft 220, the stator tube sleeve 248 may be formed to provide a lubrication path 310 between the inner peripheral surface of the stator tube 240 and an outer peripheral surface of the stator tube sleeve 248. As shown in FIG. 7, the lubrication path 310 may comprise a channel provided in an external peripheral surface of the stator tube sleeve 248 and configured to extend the entire axial length of the stator tube sleeve 248, for example, so that lubricating fluid may be expelled via one end of the hub section 246 of the stator tube 240. As shown in FIG. 6, because the stator tube sleeve 248 traverses the opening 301 of the fluid passage 300, pressurized lubricating fluid may be forced into the lubrication path 310. In addition, one or more channels 315 may be provided that run radially through the hub section 246 of the stator tube 240, for example. The pressurized fluid in the lubrication path 310 may thus be provided through the one or more channels 315 for lubricating the components, including bushings and high gear clutches, of the high gear clutch and drum assembly 250, for example.

As shown in FIG. 5, in order to lubricate a rear portion of the transmission assembly, the lubrication tube 350 that draws lubrication fluid from the fluid entering passage 300 may be routed from the stator tube 240 external to the transmission case to communicate with the valve body 295. In accordance with aspects of the present invention, an access port may be provided into the lubrication passage 300 by drilling a transverse hole through the flanged portion 244 of the stator tube 240. Although described herein as a lubrication tube 350, the lubrication tube 350 may include any suitable conduit or passageway that can provide fluid communication between the fluid passage 300 of the stator tube 240 to a different section of the transmission by access through the transmission case.

For example, as shown in FIG. 5, the valve body 295 may receive the lubrication fluid from the lubrication tube 350. The valve body 295, in turn, may transfer the lubrication fluid through an external end portion of the transmission case 290. A lubrication passage may be provided into the planetary section 260 of the transmission from the valve body 295 by forming a conduit 292 through the transmission case 290 that radially aligns, for example, with a conduit 285 through the governor support 280. An inlet 275 through the planetary output shaft 270 further communicates the fluid path into the interior of the transmission assembly. Thus, lubrication fluid provided through the lubrication tube 350 may be communicated (e.g., sprayed) onto the internal components of the transmission assembly, including the various planetary gears and other components, such as the reverse clutches, washers rear case bushings and/or bearings. In this manner, the rear internal components of the transmission assembly may be lubricated via the lubrication tube 350 without the need to provide a fluid path through the input shaft 220. The integrity of the input shaft 220 may thus be greatly enhanced.

Example aspects of the present invention have now been described in accordance with the above advantages. It will be appreciated that these examples are merely illustrative of variations thereof. Many other variations and modifications will be apparent to those skilled in the art.

What is claimed is:

1. A transmission lubrication assembly, comprising:
   a stator tube having a fluid passage and a sleeve bore;
   a solid input shaft rotatably received within the stator tube; and
   a stator tube sleeve having a lubrication path provided along an external peripheral surface thereof, wherein the stator tube sleeve is positioned in the sleeve bore to traverse an opening of the fluid passage so that communication from the fluid passage to a distal end of the sleeve bore is provided via the lubrication path.

2. The transmission lubrication assembly of claim 1, further comprising:
   a valve body;
   and a lubrication tube that provides fluid communication between the fluid passage and the valve body.

3. The transmission lubrication assembly of claim 2, further comprising:
   a pressurized lubricating fluid, wherein the lubricating fluid is simultaneously forced through the fluid passage and the lubrication tube.

4. The transmission lubrication assembly of claim 3, further comprising:
   a transmission case having a lubrication conduit, wherein the valve body transfers the lubrication fluid from the lubrication tube to the lubrication conduit.

5. The transmission lubrication assembly of claim 4, further comprising:
   a governor support having a conduit, wherein the lubrication conduit of the transmission case radially aligns with the conduit of the governor support.

6. The transmission lubrication assembly of claim 5, further comprising:
   a planetary output shaft having an inlet in fluid communication with the lubrication conduit of the transmission case and the conduit of the governor support.

7. The transmission lubrication assembly of claim 1, wherein the stator tube further comprises a conduit concentrically arranged about a forward portion of the input shaft.

8. The transmission lubrication assembly of claim 7, wherein an inner diameter of the sleeve bore is larger than an inner diameter of the conduit.

9. The transmission lubrication assembly of claim 1, wherein the sleeve bore comprises a step at a forward end thereof, and wherein the stator tube sleeve is positioned axially inside the sleeve bore to abut the step.

10. The transmission lubrication assembly of claim 1, wherein the stator tube sleeve is interference fit with the stator tube to be concentrically positioned inside the sleeve bore and around an outer surface of the input shaft.

11. The transmission lubrication assembly of claim 1, wherein the stator tube further comprises a hub section, and wherein the hub section comprises hub annulets on an outer peripheral surface to provide seats for sealing rings.

12. The transmission lubrication assembly of claim 11, wherein the hub section comprises at least one channel extending radially away from the stator tube sleeve.

13. The transmission lubrication assembly of claim 1, wherein the stator tube further comprises a flanged section, and wherein a portion of the fluid passage is cross-drilled into the flange section.

14. A method of lubricating a transmission assembly, comprising:
- providing a pressurized source of lubricating fluid;
- providing a stator tube comprising a fluid passage;
- providing a solid input shaft rotatably received within the stator tube; and
- directing a portion of the lubricating fluid to a section of the transmission assembly by way of a stator tube sleeve, wherein the stator tube sleeve comprises an axial channel through which the lubricating fluid flows from the fluid passage to the section of the transmission assembly.

15. The method of lubricating a transmission assembly of claim 14, further comprising:
- directing a second portion of the lubricating fluid to a second section of the transmission assembly by way of a lubrication tube.

16. The method of lubricating a transmission assembly of claim 15, wherein the transmission assembly further comprises a valve body and the second section comprises a planetary gear set housed in a transmission case, and wherein the lubrication tube is connected to the stator tube and the valve body; the method further comprising:
- lubricating the planetary gear set by directing the lubricating fluid from the stator tube through the lubrication tube to the valve body, wherein the valve body transfers the lubricating fluid to the second section through a conduit in the transmission case.

17. The method of lubricating a transmission assembly of claim 14, wherein the stator tube further comprises a sleeve bore having a forward seat, the method further comprising:
- situating the stator tube sleeve into the sleeve bore to abut the forward seat.

* * * * *